(12) United States Patent
Eroglu et al.

(10) Patent No.: US 6,541,928 B2
(45) Date of Patent: Apr. 1, 2003

(54) ADAPTIVE SYSTEM AND METHOD FOR SPINNING A POLYPHASE DISK DRIVE MOTOR FROM A STATIONARY POSITION

(75) Inventors: Ender T. Eroglu; Paolo Menegoli; Whitney H. Li, all of San Jose, CA (US)

(73) Assignee: STMicroelectronics, Inc., Carrollton, TX (US)

(*) Notice: Subject to any disclaimer, the term of this patent is extended or adjusted under 35 U.S.C. 154(b) by 0 days.

(21) Appl. No.: 09/751,412

(22) Filed: Dec. 29, 2000

(65) Prior Publication Data

US 2002/0084758 A1 Jul. 4, 2002

(51) Int. Cl.$^7$ .................................................. H02P 1/00
(52) U.S. Cl. ....................................... 318/254; 318/439
(58) Field of Search ............................... 318/254, 430, 318/439, 778, 779, 780, 798, 806, 809, 810; 360/73.01, 73.02, 73.03, 78.04

(56) References Cited

U.S. PATENT DOCUMENTS

| | | |
|---|---|---|
| 4,862,052 A | 8/1989 | Unsworth et al. |
| 4,876,491 A | 10/1989 | Squires et al. |
| 4,992,710 A | 2/1991 | Cassat |
| 5,001,405 A | 3/1991 | Cassat |
| 5,003,241 A | 3/1991 | Rowan et al. |
| 5,028,852 A | 7/1991 | Dunfield |
| 5,117,165 A | 5/1992 | Cassat et al. |
| 5,172,036 A | 12/1992 | Cameron |
| 5,187,419 A | 2/1993 | DeLange |
| 5,191,270 A | 3/1993 | McCormack |
| 5,202,614 A | 4/1993 | Peters et al. |
| 5,254,914 A | 10/1993 | Dunfield et al. |
| 5,276,569 A * | 1/1994 | Even .................. 360/73.02 |
| 5,343,127 A | 8/1994 | Maiocchi |
| 5,397,971 A | 3/1995 | McAllister et al. |
| 5,455,885 A | 10/1995 | Cameron |
| 5,466,997 A | 11/1995 | Utenick et al. ............. 318/254 |
| 5,473,725 A | 12/1995 | Chen et al. |
| 5,569,990 A | 10/1996 | Dunfield |
| 5,751,128 A | 5/1998 | Chalupa et al. |
| 5,850,129 A | 12/1998 | Yoshino |
| 5,936,365 A | 8/1999 | Li et al. |
| 5,969,491 A | 10/1999 | Viti et al. |
| 6,023,141 A | 2/2000 | Chalupa |
| 6,078,158 A * | 6/2000 | Heeren ...................... 318/430 |
| 6,091,222 A | 7/2000 | Vertemara et al. |
| 6,236,174 B1 | 5/2001 | White |

OTHER PUBLICATIONS

U.S. patent application Ser. No. 09/643,218, Menegoli, filed Aug. 18, 2000.

Leos Chalupa, "Low Cost High Efficiency Sensorless Drive for Brushless DC Motor Using MC68HC(7)05MC4", *Motorola Semiconductor Application Note*, 1999, pp. 1–28.

* cited by examiner

*Primary Examiner*—Khanh Dang
(74) *Attorney, Agent, or Firm*—Lisa K. Jorgenson; Andre Szuwalski

(57) ABSTRACT

A method and system are disclosed for spinning the spindle motor of a disk drive from a stationary state to an operable state that is suitable for performing a memory access operation. The method and system include energizing the polyphase motor in a first predetermined commutation phase; detecting whether a zero crossing of a back electromotive force (bemf) signal corresponding to the first predetermined commutation phase occurs; sensing whether the polyphase motor advanced to a next successive commutation phase relative to the first predetermined commutation phase; and performing an acceleration procedure to accelerate the speed of the polyphase motor towards a desired speed based upon a detected zero crossing of the bemf signal and an affirmative determination that the polyphase motor advanced to a next successive commutation phase relative to the first predetermined commutation phase.

25 Claims, 3 Drawing Sheets

ADAPTIVE SYSTEM AND METHOD FOR SPINNING A POLYPHASE DISK DRIVE MOTOR FROM A STATIONARY POSITION

BACKGROUND OF THE INVENTION

1. Technical Field of the Invention

The present invention relates to spinning a polyphase motor from a stationary position to a desired velocity, and particularly to a system and method for adaptively spinning a polyphase motor based in part upon the motor position during the time the motor is initially energized.

2. Description of the Related Art

Although the present invention pertains to multiphase and/or polyphase dc motors, in general, it finds particular application in conjunction with three phase dc motors, particularly of the brushless, sensorless type which are used for rotating data media, such as found in computer related applications, including hard disk drives, CD ROM drives, floppy disks, and the like. In computer applications, three phase brushless, sensorless dc motors are becoming more popular, due to their reliability, low weight, and accuracy.

Motors of this type can typically be thought of as having a stator with three coils and/or windings connected in a "Y" configuration, although actually, a larger number of stator windings are usually employed with multiple motor poles. Typically, in such applications, eight pole motors are used having twelve stator windings and four N-S magnetic sets on the rotor, resulting in four electrical cycles per revolution of the rotor. The stator windings, however, can be analyzed in terms of three "Y" connected coils, connected in three sets of four coils and/or windings, each physically separated by 90 degrees. In operation, the windings are energized in sequences or commutation phases, in each of which a current path is established through two windings of the "Y", with the third winding left floating. The sequences are arranged so that as the current paths are changed, or commutated, one of the windings of the current path is switched to float, and the previously floating winding is switched into the current path. Moreover, the commutation sequence or phase is defined such that when the floating winding is switched into the current path, current will flow in the same direction in the winding which was included in the prior current path. In this manner, six commutation sequences are defined for each electrical cycle in a three phase motor.

In the past, during the operation of a polyphase dc motor for a disk drive system, such as a spindle motor for spinning the disk media upon which data is stored, it has been recognized that maintaining a known position of the rotor of the motor is an important concern. There have been various ways by which this was implemented. The most widely used way, for example, was to start the spindle motor in a known position, then develop information related to the instantaneous or current position of the rotor. One source of such instantaneous position information was developed as a part of the commutation process, and involved identifying the floating winding, and monitoring its back emf, that is, the emf induced into the coil as it moves through the magnetic field provided by the stator.

When the voltage of the floating winding crossed zero (referred to in the art as "a zero crossing"), the position of the rotor was assumed to be known. Upon the occurrence of this event, the rotor winding commutation sequence was incremented to the next commutation phase, and the process repeated. The assumption that the zero crossing accurately indicated the rotor position was generally correct if the spindle motor was functioning properly, and nothing had occurred which would disturb its synchronization from its known startup position. However, in reality, events occur which sometimes result in a loss of synchronization. Such a loss of synchronization may occur, for instance, if the spindle motor of the disk drive is slowed due to a relatively prolonged absence of requests to access the disk drive. The motor controller of the disk drive must thereafter determine the state of the rotor in order to appropriately respond to the reception of a memory access request. In particular, the motor controller must relatively rapidly spin up and/or increase the spin of the motor to an operable spin level before the requested memory access can occur.

Conventional disk drive systems attempt to quickly spin up the spindle motor from an inactive state by initially determining the position of a stationary spindle motor and thereafter applying drive signals thereto. Assuming that the spindle motor was moving and/or responding to the applied drive signals as expected after initially energizing the motor, the conventional disk drive systems would not closely monitor the status and/or position of the spindle motor, thereby increasing the likelihood of the spindle motor not operating as desired. Consequently, in some instances the spindle motor in conventional disk drive systems would not efficiently spin up from a stationary or inactive state to a desired velocity.

SUMMARY OF THE INVENTION

The present invention overcomes the shortcomings in prior systems and thereby satisfies a significant need for a method and system for adaptively spinning up the spindle motor of a disk drive from a stationary state to an operable state for performing a memory access operation. The system and method include initially repeatedly energizing the motor from a known stationary position, detecting whether the motor moved as desired each time the motor is energized and performing a position sense operation to confirm the motion detected. The motor is energized based upon the sensed position. Upon the occurrence of consecutive detections of motor movement that are each confirmed by a position sense operation, an acceleration procedure is applied to the motor to quickly ramp up the velocity of the motor to the desired level to perform a memory access operation. By closely monitoring the status of the motor each time the motor is initially energized, the desired operation of the motor is better ensured.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown.

Figure 1:
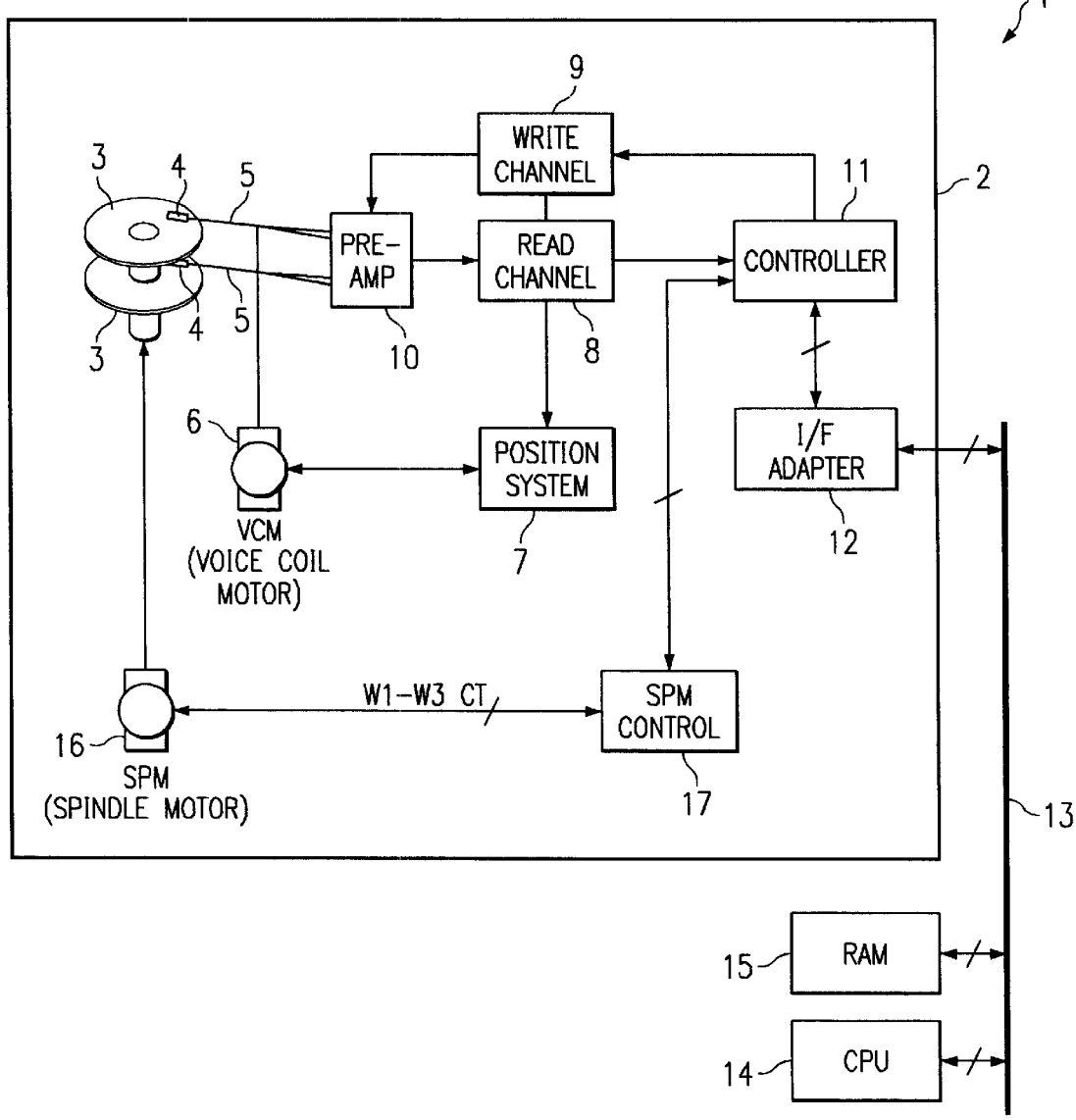
FIG. 1 is a function block diagram of a system having a disk drive in accordance with an embodiment of the present invention.

Referring to FIG. 1, there is shown a block diagram of a data storage and/or computer system 1 including a disk drive 2 in accordance with the present invention. Disk drive 2 includes a storage medium in the form of one or more disks 3, each of which may contain data on both sides of the disk. Data is written to disks 3 and/or read therefrom by one or more read/write heads 4. Each read/write head 4 is connected to an arm 5, with both read/write heads 4 and arm 5 being positionally controlled by a voice-coil motor ("VCM") 6 and a position system 7. The position system 7, through VCM 6, positionally maintains and/or moves heads 4 radially over the desired data on disks 3. A read channel 8 converts an analog read signal from heads 4 into digital form. A write channel 9 provides data in analog form to read/write head 4 for storing on a disk 3. A pre-amplifier 10 suitably conditions data read from and data to be written to disk 4. Channel controller 11 recognizes and organizes the digital data from the read channel 8 and digital data to be sent to write channel 9 into bytes of data. An interface adapter 12 provides an interface between channel controller 11 and a system bus 13 that may be particular to the host (data storage and/or computer-based) system. The host system will also typically have other devices that communicate on system bus 13, including a central processing unit ("CPU") 14 and memory 15.

Figure 2:
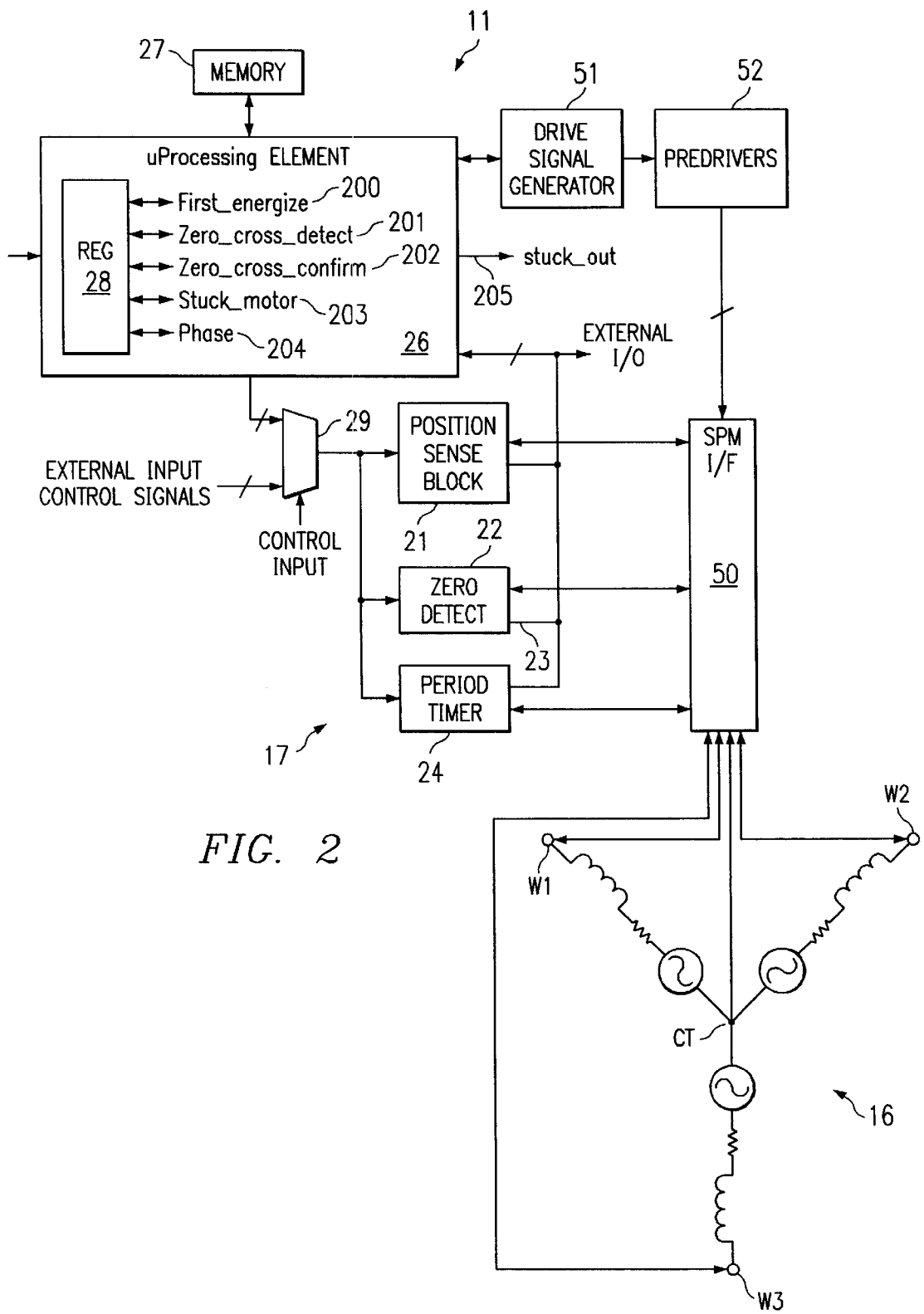
FIG. 2 is a function block diagram of a portion of the disk drive shown in FIG. 1.

A spindle motor ("SPM") 16 and SPM control block 17 rotate disk 3 and maintain disk 3 at the proper speed for performing a memory access operation (read or write operation). The SPM control block 17 may be controlled by or otherwise communicate with channel controller 11, as shown in dashed lines in FIG. 1. For exemplary purposes, spindle motor 16 will be described as a three phase motor connected in a star configuration. In this way, motor 16 includes three windings W1–W3 and a center tap CT (FIG. 2). It is understood, however, that motor 16 may be another type of motor.

It is understood that disk drive 2 may be divided into and/or include other function blocks from those shown in FIG. 1, and that the particular function block implementations illustrated in FIG. 1 are presented as an exemplary embodiment of the present invention.

Referring to FIG. 2, there is shown a portion of controller 11 and SPM control block 17 for controlling spindle motor 16 of disk drive system 1 in accordance with an embodiment of the present invention. In general terms, controller 11 and SPM control block 17 control spindle motor 16 so that data stored on disks 3 may be efficiently accessed. Among other things, controller 11 and SPM control block 17 control the velocity of spindle motor 16 prior to and during the time data is accessed from disks 3. In particular, controller 11 and SPM control block 17 are capable of spinning spindle motor 16 from an initial stationary position to an operable speed at which data from disks 3 may be accessed.

SPM control block 17 may include a position sense block 21 that is connected to the windings W1–W3 and center tap CT of motor 16 and selectively performs a procedure to determine the position of motor 16, and particularly the commutation phase in which motor 16 is located. Position sense block 21 may, for example, include circuitry to perform an inductive sense operation to determine the position of motor 16. Because inductive sense operations are known in the art, the particular circuit implementation of and set of steps undertaken by position sense block 21 will not be described for reasons of simplicity. Position sense block 21 receives control signal(s) from controller 11 to activate or trigger position sense block 21 to perform its sense operation.

SPM control block 17 may further include a zero detect circuit 22 which selectively determines whether and when the back electromotive force (bemf) signals associated with windings W1–W3 of motor 16 cross a zero axis, such as a zero voltage axis. Zero detect circuit 22 monitors windings W1–W3 and center tap CT and generates one or more signals 23 that indicate when bemf signals cross the zero axis. Zero detect circuit 22 may include, for example, voltage comparators (not shown) having input terminals connected to windings W1–W3 and center tap CT of motor 16. Zero detect circuit 22 may receive control signals from controller 11 to enable zero detect circuit 22 to perform the zero detection operation.

SPM control block 17 may further include a period timer element 24 that is utilized for measuring the amount of time that elapses between successive zero crossings of the bemf signals associated with windings W1–W3. Period timer element 24 is selectively enabled to count by controller 11, based upon the value of signal 23 generated by zero detect circuit 22. Period timer element 24 is additionally selectively reset to an initial logic state by controller 11. The measured time period indicated by period timer element 24 is used to predict the next zero crossing of a bemf signal and hence the time when zero detect circuit 22 is to be enabled by controller 11.

Position sense block 21 and zero detect circuit 22 are coupled to windings W1–W3 and center tap CT of motor 16 via SPM interface block 50. SPM control block 17 may include drive signal generator 51 which selectively generates drive signals to be applied to motor 16. Drive signal generator 51 may receive control signals from controller 11 for controlling the generation of the drive signals and applying the drive signals to motor 16. SPM control block 17 may further include predriver circuit 52 which suitably conditions the generated drive signals for driving motor 16.

Controller 11 may include a microprocessing element 26 and corresponding memory 27 which are adapted to control, among other function blocks, position sense block 21, zero detect circuit 22 and period timer element 24. Memory 27 may include program and/or software code representing a predetermined sequence of operations to be carried out by microprocessing element 26 so that spindle motor 16 may be adaptively spun from an initial stationary position to an operable speed for accessing data from disks 3.

Controller 11 and/or microprocessing element 26 may include a status register 28, in which the value of a number of signals and/or variables may be temporarily stored. The particular signals that are selectively temporarily stored in status register 28 are discussed in greater detail below.

Controller 11 and SPM control block 17 are capable of spinning spindle motor 16 from a stationary position to an operable speed that is conducive for data to be efficiently read from disks 3. In accordance with an embodiment of the present invention, controller 11 and SPM control block 17 adaptively spin motor 16 up from a stationary position. In this way, drive signals applied to windings W1–W3 of motor 16 are more closely tied to the instantaneous position thereof.

The operation of the controller 11 and SPM control block 17 will be described with respect to FIG. 3. Initially, it is assumed that disk drive 2 has undergone a prolonged period of disk drive inactivity without having to respond to a request for a memory access. During this period of inactivity in which disk drive 2 is in a "standby" state, spindle motor 16 is assumed to have spun down considerably relative to an operable speed at which a memory access operation may efficiently occur. Controller 11 and SPM control block 17 adaptively control spindle motor 16 so as to relatively quickly bring spindle motor 16 from the standby state to an operable state and/or a state at which a memory access operation may occur.

One or more sense operations may be undertaken by microprocessor element 26 and SPM control block 17 at step 30 to determine that spindle motor 16 is not moving and is positioned in a particular commutation phase. Microprocessing element 26 may cooperate with a motion sense block (not shown) to determine that motor 16 is stationary, and with position sense block 21 to determine the particular commutation phase in which motor 16 is positioned. Once motor 16 is found to be stationary and in a particular commutation phase, controller 11 and SPM control block 17 may commence operations to bring spindle motor 16 to the desired operational speed.

In general terms, once motor 16 is determined to be in a stationary position, microprocessing element 26 and SPM control block 17 will adaptively spin up motor 16 to an operable speed by initially applying drive signals thereto that are based upon the particular, instantaneous commutation phase motor 16 is in. In order to determine such commutation phase, the bemf signals associated with windings W1–W3 are monitored. The zero crossings of the bemf signals associated with windings W1–W3 indicate the position of motor 16. Microprocessing element 26 and SPM control block 17 detect the zero crossings of the bemf signals of windings W1–W3 to identify the particular phase motor 16 is in, and confirm such identification due to the presence of noise commonly appearing on windings W1–W3 and hence adversely affecting the true value of the bemf signals. When two or more successive, confirmed zero detections of the bemf signals occur following motor 16 being initially energized, motor 16 is believed to be spinning at a sufficient velocity to commence an acceleration procedure that quickly brings motor 16 to the desired operable speed. Determinations are also performed to see if spindle motor 16 is stuck and cannot move as desired.

Figure 3:
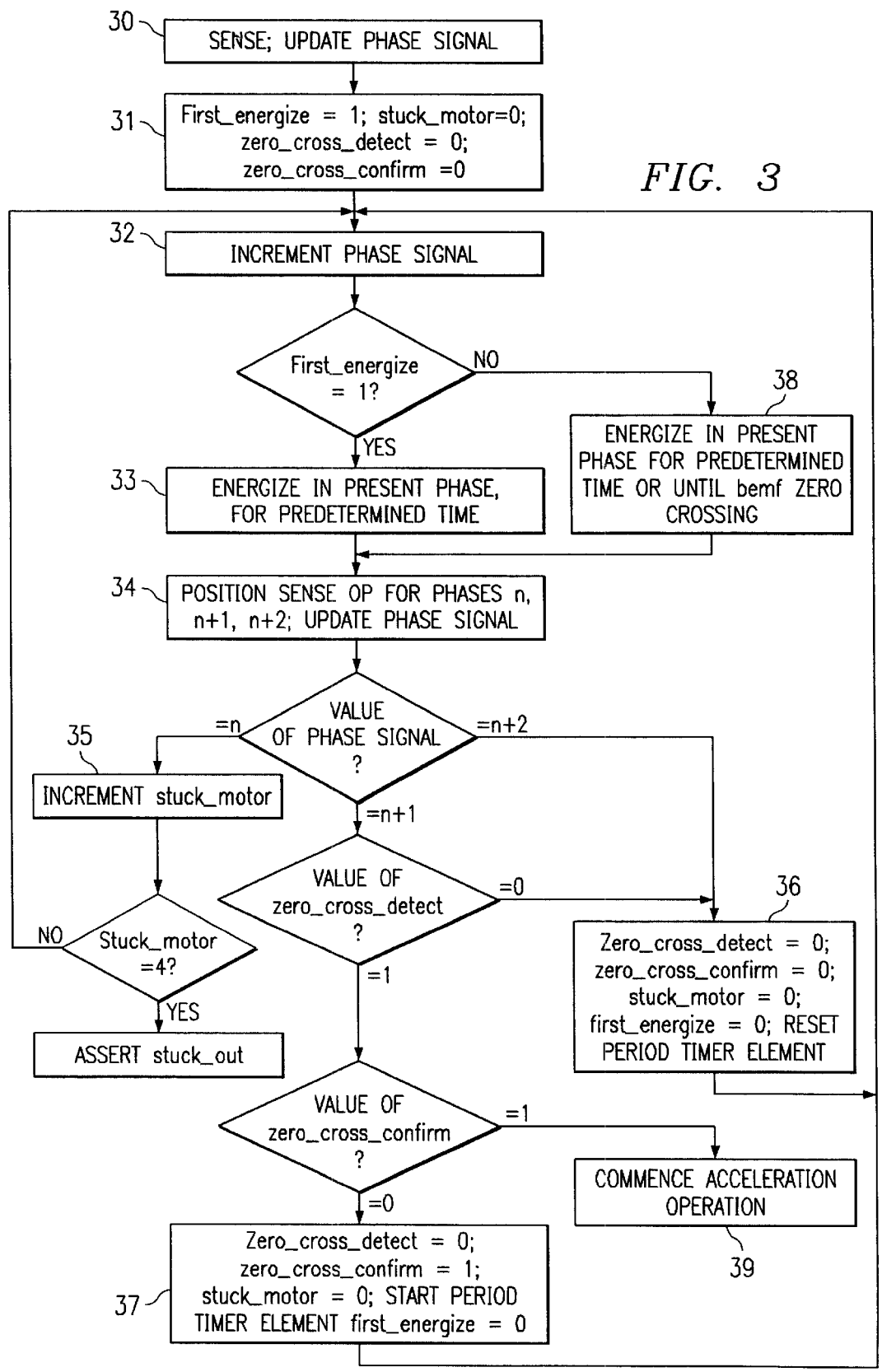
FIG. 3 is a flow chart illustrating an operation of the disk drive of FIG. 1 in accordance with an embodiment of the present invention.

With reference to FIG. 3, at step 31 microprocessing element 26 initially stores in status register 28 a first_energize signal 200 with a high binary value; signal zero_cross_detect 201 with a low binary value; signal zero_cross_confirm 202 with a low binary value; signal stuck_motor 203 with a value of zero; and signal phase 204 with a value corresponding to the particular commutation phase (commutation phases P0–P5) that motor 16 is in, based upon the sense operation performed in step 30. The value of these signals will be utilized to effectuate motor 16 approaching operable speeds as discussed in greater detail below.

The value of phase signal 204 is then incremented by microprocessing element 26 at step 32 to correspond to the next commutation phase in succession following the commutation phase in which motor 16 is positioned. For example, if the sense operation(s) during step 30 showed that motor 16 is positioned in commutation phase one (P1) phase signal 204 is incremented to a value corresponding to commutation phase two (P2). Next, windings W1–W3 are energized in step 33 in the commutation phase corresponding to the value of phase signal 204 for a predetermined period of time. In this way, motor 16 is energized in the next commutation phase succeeding the commutation phase in which motor 16 currently resides. The predetermined period of time may be programmable. By way of one example, the predetermined period of time is 5 ms.

During the time motor 16 is being energized, microprocessing element 26 initially masks a zero detect operation of a bemf signal that is normally undertaken. This is done because any zero crossing of a bemf signal following a first energization of motor 16 usually cannot be distinguished from noise appearing on windings W1–W3. It is noted that the value of first_energize signal 200 is relied upon by microprocessing element 26 to keep zero detect circuit 22 from detecting a zero crossing of the appropriate bemf signal.

Next, microprocessing element 26 enables position sense block 21 at step 34 to perform a position sense operation that determines the particular commutation phase in which motor 16 now resides. This position sense operation is usually used to confirm that motor 16 moved to the next succeeding commutation phase in response to the energizing thereof during step 33. Position sense block 21 senses whether motor 16 is in the commutation phase motor 16 was in prior to step 33 and each of the next two commutation phases in succession thereto. As a result of the position sense operation, phase signal 204 is updated by microprocessing element 26 to indicate the particular commutation phase sensed during step 34.

At this point the value of phase signal 204 is considered. In the event the value of phase signal 204 is the same as the value of phase signal 204 prior to step 32, thereby indicating that motor 16 has not yet moved, the value of stuck_motor signal 203 is incremented by one by microprocessing element 26 and stored in status register 28 at step 35. If stuck_motor signal 203 is equal to a predetermined number, such as four, thus indicating multiple, successive instances wherein motor 16 was energized and failed to move, microprocessing element 26 generates an external output signal stuck$_{13}$_out 205 having a value indicating that motor 16 is stuck and cannot respond to energization signals as desired. Otherwise, microprocessing element 26 prepares for another iteration of energizing motor 16 by preparing for re-execution of step 32.

If the value of phase signal 204 indicates that motor 16 has moved in response to the energization thereof in step 33, microprocessing element 26 checks to see if two or more confirmed zero crossings were detected in succession. If a zero detection failed to occur (zero_cross_detect signal 201 being a logic low value) or if motor 16 was not moved into the very next commutation phase (the present value of phase signal 204 not being incremented by one as a result of the inductive position sense step 34), zero_cross_detect signal 201, zero_cross_confirm signal 202 and stuck_motor signal 203 are each set to a low logic level at step 36 by microprocessing element 26. In addition, period timer element 24 is reset and first_energize signal 200 is set to a low logic level to indicate that the first iteration of energizing motor 16 has been completed. In this case, microprocessing element 26 then prepares for a next iteration of energizing motor 16 by preparing to re-execute step 32.

Alternatively, if a zero crossing of motor 16 was detected during the latest iteration of energizing motor 16 (zero_cross_detect signal 201 having a logic high value) and the commutation phase of motor 16 was successively incremented by one as sensed during the position sense operation of step 34, then a confirmed movement of motor 16 is said to have occurred. However, if two or more consecutive confirmed detected motor movements have not yet occurred (zero_cross_confirm signal 202 having a logic low level), another iteration of energizing motor 16 must occur. Consequently, at step 37 first_energize signal 200, zero_cross_detect signal 201 and stuck_motor signal 203 are reset to the low logic level by microprocessing element 26, and zero_cross_confirm signal 202 is set to a high logic level to indicate a confirmation that motor 16 moved to the very next commutation phase and a zero cross detection of the appropriate bemf signal occurred. Microprocessing element 26 also enables period timer element 24 to begin counting. Microprocessing element 26 then prepares for a next iteration of energizing motor 16 by preparing to re-execute step 32.

As with the previously discussed iteration, subsequent iterations are intended to energize motor 16 to move to the next successive commutation phase and to confirm such movement. Since subsequent iterations are not the first iteration for energizing motor 16 (first_energize signal 200 being a low logic level), motor 16 is believed to be capable of providing bemf signals that can be suitably distinguished from noise appearing on windings W1–W3. Motor 16 is thus energized and the appropriate bemf signal is monitored to see if it crosses the zero axis.

In particular, phase signal 204 is incremented and stored by microprocessing element 26 at step 32 to a value corresponding to the next commutation phase succeeding the commutation phase in which motor 16 was sensed during step 34 from the previous iteration. At step 38, microprocessing element 26 controls the energizing of motor 16 for the predetermined period of time or until the bemf signal of the corresponding winding W1–W3 of motor 16 crosses the zero axis. If zero detect circuit 22 detects the zero crossing of the bemf signal, zero_cross_detect signal 201 is set to a high logic level by microprocessing element 26. On the other hand, if zero detect circuit 22 does not detect a zero crossing of the appropriate bemf signal, zero_cross_detect signal 201 is set to a low logic level. Period timer element 24 is also disabled from counting by microprocessing element 26 at this time.

Microprocessing element 26 then re-enables position sense block 21 at step 34 to perform a position sense operation for sensing in the present commutation phase of motor 16 (indicated by the value of phase signal 204) and the two commutation phases immediately succeeding the present commutation phase. This allows position sense block 21 to quickly determine the commutation phase in which motor 16 now resides, and provide the determined phase to microprocessing element 26. During this step, microprocessing element 26 also updates phase signal 204 to the value corresponding to the determined commutation phase.

The value of phase signal 204 is analyzed as discussed above with respect to the first iteration of energizing motor 16. If the determined phase of motor 16 matches the phase thereof prior to energizing motor 16 in step 38, microprocessing element 26 increments the value of stuck_motor signal 203. If the value of stuck_motor signal 203 exceeds a predetermined value, such as four, microprocessing element 26 places a value on external signal stuck_out 205 to indicate that motor 16 is stuck and cannot move in response to energizing as desired. Otherwise, microprocessing element 26 prepares for another iteration for energizing motor 16.

Alternatively, if the value of phase signal 204 does not correspond to the next commutation phase succeeding the phase motor 16 was in prior to step 38 (i.e., motor 16 did advance but not to the next commutation phase as expected) or if the value of zero_cross_detect signal 201 is the low logic level (i.e., no zero crossing of the appropriate bemf signal was detected), step 36 is repeated and microprocessing element 26 prepares for the next iteration for energizing motor 16.

Further, if the value of phase signal 204 indicates motor 16 successfully advanced to the next successive commutation phase during step 38 and such advancement was confirmed by the position sense operation of step 34) and if zero_cross_confirm is at a logic low level (indicating that the previously completed iteration did not yield a confirmed zero crossing), step 37 is repeated and microprocessing element 26 prepares for the next iteration for energizing motor 16.

However, if the value of phase signal 204 indicates motor 16 successfully advanced to the next commutation phase during step 38 and such advancement was confirmed by the position sense operation, and if $zero_{13}$ cross_confirm signal 202 is at a logic high level (indicating that the previously completed iteration yielded a confirmed movement of motor 16), a sufficient level of the bemf signals is deemed to exist on the windings W1–W3 of motor 16 to quickly spin up motor 16 from its present state. Microprocessing element 26 initiates an acceleration routine at step 39 to be performed to quickly spin up motor 16 to the desired velocity.

Controller 11 and SPM control block 17 thus performs an adaptive spin up routine followed by an acceleration routine to bring motor 16 to an operable velocity to perform a memory access operation. By monitoring the zero crossings of the bemf signals and verifying/confirming the advancement of motor 16 through the commutation phases during the time motor 16 is initially energized, the synchronization of motor 16 to the drive and/or energized signals initially applied thereto is ensured.

Referring to FIG. 2, controller 11 may further include multiplexing circuitry 29 that allows for microprocessing element 26 and memory 27 to be replaced. Multiplexing circuit 29 may be selectively configured so that position sense block 21, zero detect circuit 22 and period timer element 24 are controlled by an external device or devices.

In the embodiment of the present invention shown in FIGS. 1 and 2, the present spin up routine utilized to bring motor 16 to an operable velocity is implemented in both software (program code instructions stored in memory 27) and hardware (position sense block 21, zero detect circuit 23 and period timer element 24). It is understood that the portion of controller 11 and SPM control block 17 shown in FIG. 2 may be implemented in mostly hardware by replacing microprocessing element 26 and memory 27 with a state machine (not shown). In this case, the state machine and thus the entire circuit for performing the present adaptive spin up routine may be located substantially within SPM control block 17.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling the velocity of a polyphase motor, comprising:

energizing the polyphase motor in a first predetermined commutation phase;

detecting whether a zero crossing of a back electromotive force (bemf) signal corresponding to the first predetermined commutation phase occurs;

sensing whether the polyphase motor advanced to a next successive commutation phase immediately following in succession the first predetermined commutation phase;

following the step of sensing, energizing the polyphase motor in a second predetermined commutation phase immediately following in succession the first predetermined commutation phase;

detecting whether a zero crossing of a bemf signal corresponding to the second predetermined commutation phase occurs;

sensing whether the polyphase motor advanced to a next successive commutation phase immediately following in succession the second predetermined commutation phase; and performing an acceleration procedure to accelerate the speed of the polyphase motor towards a desired speed based upon a detected zero crossing of the bemf signals in response to each of the steps of energizing and an affirmative determination that the polyphase motor advanced to the next successive commutation phase immediately following the first predetermined commutation phase in response to the step of energizing in the first commutation phase and immediately following the second predetermined commutation phase in response to the steps of energizing in the second commutation phase.

2. The method of claim 1, wherein:
the second predetermined commutation phase is a next succeeding commutation phase relative to the commutation phase sensed during the sense of sensing whether the polyphase motor advanced to the next successive commutation phase relative to the second predetermined commutation phase.

3. The method of claim 1, further comprising:
measuring a time period between consecutive zero crossings of bemf signals.

4. The method of claim 1, further comprising:
upon an affirmative determination during either step of sensing that the polyphase motor remained in the corresponding predetermined commutation phase, maintaining a record of the polyphase motor not moving in response to being energized.

5. The method of claim 4, further comprising:
indicating that the polyphase motor is not responsive to being energized based upon the existence of a plurality of maintained records of the polyphase motor not moving in response to being energized.

6. The method of claim 1, further comprising:
indicating that the polyphase motor is stuck in the first predetermined position, based in part upon a determination during the first step of sensing that the polyphase motor remained in the first predetermined commutation phase.

7. The method of claim 1, further comprising:
prior to the initial step of energizing, determining that a position of the polyphase motor corresponds to an initial commutation phase, the first predetermined commutation phase being a next commutation phase succeeding the initial commutation phase.

8. The method of claim 1, wherein:
prior to the initial step of energizing, initially determining that the polyphase motor is not moving.

9. The method of claim 1, wherein:
each step of energizing occurs for no more than a predetermined period of time.

10. The method of claim 1, wherein:
the polyphase motor is energized during each step of energizing until a first occurrence of a predetermined period of time and a zero crossing on the bemf signal.

11. The method of claim 1, wherein:
each step of sensing comprises performing an inductive sense operation.

12. A disk drive system, comprising:
at least one disk on which data is stored;
at least one head positioned proximally to the disk;
a spindle motor, connected to spin the disk, having a rotor and a plurality of phase windings; and
spindle motor control circuitry, connected to the phase windings of the spindle motor, for controlling the spindle motor, the spindle motor control circuitry being responsive to a request for performing a memory access following a period of disk drive inactivity by energizing the spindle motor in two or more separate instances, detecting whether any back emf signal crossed a zero axis in response to the energizing in each of two or more consecutive instances, selectively confirming whether the spindle motor moved in response to the energizing in each of the two or more consecutive instances to a next commutation phase immediately following in succession the commutation phase in which the energizing occurred, and accelerating the speed of the spindle motor towards a desired speed based upon an affirmative determination and an affirmative confirmation.

13. The disk drive of claim 12, wherein:
the spindle motor control circuitry comprises:
position sense circuit for selectively sensing a position of the spindle motor and generating a signal having a value that corresponds to the sensed position; and
zero detection circuitry for selectively detecting whether one or more back electromotive force (bemf) signals relating to the phase windings of the spindle motor crosses a zero axis; and
a controller device for selectively enabling the position sense circuit and the zero detection circuitry.

14. The disk drive of claim 13, wherein:
the controller device comprises a microprocessing unit having output signals that are coupled to the position sense circuit and the zero detection circuitry as inputs thereto.

15. The disk drive of claim 12, wherein:
the spindle motor control circuit iteratively repeats the energizing of the spindle motor, the detecting whether the spindle motor moved and the selectively confirming whether the spindle motor moved to a next sequential commutation phase until detected movement of the spindle motor and confirmations thereof to next sequential commutation phases occur in response to at least two consecutive instances of energizing the spindle motor.

16. The disk drive of claim 12, wherein:
the spindle motor control circuit determines whether the spindle motor is stuck in a commutation phase.

17. The disk drive of claim 12, wherein:
the spindle motor control circuit indicates whether the spindle motor failed to move in response to a predetermined number of consecutive instances of energizing the spindle motor.

18. The disk drive of claim 12, wherein:
the spindle motor control circuitry detects movement of the spindle motor by detecting a zero crossing of back electromotive force signals of the phase windings of the spindle motor.

19. A controller for a polyphase motor, comprising:

a control element;

drive circuitry, coupled to the polyphase motor and controlled by the control element, for selectively energizing the polyphase motor a number of times;

detection circuitry, coupled to the polyphase motor and enabled by the control element, for selectively detecting whether a zero crossing of a back electromotive force (bemf) signal corresponding to the first predetermined commutation phase occurs each time the drive circuitry energizes the polyphase motor; and sense circuitry, coupled to the polyphase motor and enabled by the control element, for selectively sensing whether the polyphase motor advanced to a next successive commutation phase each time the drive circuitry energizes the polyphase motor;

wherein the control element and the drive circuitry selectively perform an acceleration procedure to accelerate the speed of the polyphase motor towards a desired speed based upon the detection circuitry detecting a zero crossing of the bemf signal in response to each of at least two consecutive times the drive circuitry energizes the polyphase motor and the sense circuitry determines that the polyphase motor advanced to a next successive commutation phase in response to each of the at least two consecutive times the drive circuitry energizes the polyphase motor.

20. The controller of claim 19, wherein:

the control element comprises a microprocessing element and memory having software code stored therein.

21. The controller of claim 19, wherein:

the sense circuitry inductively senses whether the polyphase motor advances to commutation phases other than the first predetermined commutation phase.

22. The controller of claim 20, wherein:

the control element controls the drive circuitry, the detection circuitry and the sense circuitry so as to iteratively energize the polyphase motor, detect whether a zero crossing of bemf signals corresponding to the polyphase motor occurs, and sense whether the polyphase motor advanced to next successive commutation phase a number of times until the detection circuitry detects the zero crossing of an appropriate bemf signal and the sense circuitry senses advancement of the polyphase motor to a next successive commutation phase in response to consecutive instances of the drive circuitry energizing the polyphase motor.

23. The controller of claim 20, wherein:

the sense circuitry determines whether the polyphase motor moved in response to being energized by the drive circuitry; and the control element maintains a record of the polyphase motor not moving in response to being energized by the drive circuitry.

24. The controller of claim 23, wherein:

the control element indicates that the polyphase motor has not moved in response to successive instances of being energized by the drive circuitry.

25. The controller of claim 20, wherein the controller indicates that the polyphase motor is nonresponsive to energizings by the drive circuitry upon the sense circuitry failing to detect movement by the polyphase motor in response to two or more consecutive instances of being energized by the drive circuitry.

* * * * *

UNITED STATES PATENT AND TRADEMARK OFFICE
CERTIFICATE OF CORRECTION

PATENT NO.     : 6,541,928 B2
DATED          : April 1, 2003
INVENTOR(S)    : Ender T. Eroglu et al.

It is certified that error appears in the above-identified patent and that said Letters Patent is hereby corrected as shown below:

Column 5,
Lines 56-57, replace "phase one (P1) phase signal" with -- phase one (P1), phase signal --

Column 6,
Line 33, replace "$stuck_{13}$ out 205" with -- stuck_out 205 --

Column 8,
Line 13, replace "$zero_{13}$ cross_confirm signal" with -- zero_cross_confirm signal --

Signed and Sealed this

Tenth Day of February, 2004

JON W. DUDAS
*Acting Director of the United States Patent and Trademark Office*